United States Patent
Suzuki et al.

(10) Patent No.: US 8,120,860 B2
(45) Date of Patent: Feb. 21, 2012

(54) CONVERSION LENS, CONVERSION LENS SYSTEM, AND IMAGING DEVICE

(75) Inventors: Akira Suzuki, Kanagawa (JP); Fumisada Maeda, Tokyo (JP); Masahiko Ito, Tokyo (JP); Yoshiki Okamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 12/414,203

(22) Filed: Mar. 30, 2009

(65) Prior Publication Data

US 2009/0251792 A1 Oct. 8, 2009

(30) Foreign Application Priority Data

Apr. 4, 2008 (JP) .............................. P2008-098534

(51) Int. Cl.
*G02B 3/12* (2006.01)
*G02B 3/14* (2006.01)
*G02B 15/02* (2006.01)
(52) U.S. Cl. ........................ 359/666; 359/672
(58) Field of Classification Search .......... 359/665–667, 359/672–675
See application file for complete search history.

(56) References Cited

U.S. PATENT DOCUMENTS

| | | | |
|---|---|---|---|
| 504,890 A | | 9/1893 | Ohmart |
| 5,394,207 A | * | 2/1995 | Fujisaki ........................ 396/55 |
| 5,574,598 A | * | 11/1996 | Koumura et al. ............. 359/666 |
| 5,589,239 A | | 12/1996 | Tomono et al. |
| 6,344,930 B1 | * | 2/2002 | Kaneko et al. ................ 359/666 |
| 7,256,943 B1 | * | 8/2007 | Kobrin et al. ................. 359/666 |
| 2007/0030573 A1 | | 2/2007 | Batchko et al. |
| 2009/0116118 A1 | * | 5/2009 | Frazier et al. ................. 359/666 |

FOREIGN PATENT DOCUMENTS

| | | |
|---|---|---|
| FR | 914827 | 10/1946 |
| FR | 2634287 | 1/1990 |
| JP | 56-093702 | 7/1981 |
| JP | 2002-214529 | 7/2002 |
| JP | 2004-247947 | 9/2004 |
| JP | 61208025 | 9/2009 |
| JP | 09-021906 | 1/2010 |

OTHER PUBLICATIONS

Japanese Office Action for corresponding JP 2008-098534 issued on Jan. 12, 2010.
European Search Report (EP 09004051.0) dated Jul. 9, 2009.
European Office Action dated Oct. 4, 2011, for corresponding European Appln. No. 09004051.0.

* cited by examiner

*Primary Examiner* — Scott J Sugarman
(74) *Attorney, Agent, or Firm* — K&L Gates LLP

(57) ABSTRACT

A conversion lens which includes a pair of transparent members is provided. At least one of the transparent members is formed of a deformable film; a connecting member for connecting the pair of transparent members so as to form a sealed space sandwiched between the pair of transparent members; a liquid filled in the sealed space; and a curvature changing mechanism for changing the curvature of the deformable film by moving the liquid filled in the sealed space. A conversion lens system and an imaging device, provided with the conversion lens are also provided.

13 Claims, 11 Drawing Sheets

CONVERSION LENS, CONVERSION LENS SYSTEM, AND IMAGING DEVICE

CROSS REFERENCES TO RELATED APPLICATIONS

The present application claims priority to Japanese Priority Patent Application JP 2008-098534 filed in the Japan Patent Office on Apr. 4, 2008, the entire content of which is hereby incorporated by reference.

BACKGROUND

A variety of the front mounted type wide convertors have been hitherto proposed as conversion lenses for use in imaging devices such as still cameras and video camcorders, in which these convertors are configured to be mounted on the side of object to be photographed, or in front of imaging lens, and to change the focal length of the imaging device as a whole to the wide-angle range while maintaining the focal plane of entire imaging lens system at a fixed position.

For example, a wide-angle conversion lens is disclosed in Japanese Unexamined Patent Application Publication No. 2002-214529, to be mounted on the object side of a zoom lens as a major lens system and capable of expanding the image angle of the entire lens system. This wide-angle conversion lens is formed of three lenses, including a concave meniscus lens having a convex face thereof facing the object side, an aspheric lens of plastics, and a convex lens placed on the object side further from the concave meniscus lens.

In addition, among conversion lenses there may be mentioned a wide-end convertor formed only of one group of concave lenses (inclusive of single concave lens). By mounting this wide-end convertor formed of one group of concave lenses (or one concave lens), the focal length at only a wide-angle end is changed to the range of further wide-angle and the photographing becomes feasible at wider image angles.

The class of lens such as a wide-end convertor is suitably adapted to less expensive and light weight use, on the one hand, because of the relatively simple composition of the lens mounted in front of the zoom lens of imaging device body, but it can be focused only at its wide angle end. As a result, the wide end convertor itself may need to be dismounted from the imaging device body when the photography on the telephoto side is intended.

Furthermore, there also cited among conversion lenses is a close-up lens for enabling macro photography. For the close-up lens as well, the operation of mounting/dismounting may be required for switching between macro and standard photography.

In view of the above-mentioned and other difficulties, it is desirable to provide a conversion lens and conversion lens system for enabling the switching from the standard focal length range to either wide-angle or macro range, and vise versa. Further, it is desirable to provide an imaging device incorporating the conversion lens and conversion lens system.

SUMMARY

The present disclosure generally relates to conversion lenses and systems, and more specifically to a conversion lens and lens system having wide and macro functions, and an imaging device provided with the conversion lens system.

According to an embodiment, there is provided a conversion lens. The conversion lens includes a pair of transparent members, at least one thereof being formed of a deformable film; a connecting member for connecting the pair of transparent members so as to form a sealed space sandwiched between the pair of transparent members; a transparent liquid filled in the sealed space; and a curvature changing mechanism for changing the curvature of the deformable film by moving the transparent liquid filled in the sealed space.

In the conversion lens according to the embodiment, at least one of the pair of transparent members is formed with a deformable film and this deformable film is deformed into the shape of either concave, plane, or convex by the curvature changing mechanism. Therefore, the shape of the conversion lens is changed to several shapes such as those of a concave, plane, and convex lens.

According to another embodiment, there is provided a conversion lens system including a conversion lens and a curvature control device. The conversion lens includes a pair of transparent members, at least one thereof being formed of a deformable film; a connecting member for connecting the pair of transparent members to form a sealed space sandwiched between the pair of transparent members; a transparent liquid filled in the sealed space; and a curvature changing mechanism for changing the curvature of the deformable film by moving the transparent liquid filled in the sealed space. The curvature control device is configured to control the change of the curvature of the deformable film by controlling the curvature changing mechanism.

With the conversion lens system according to the embodiment, since the curvature control device is provided for controlling the curvature changing mechanism that changes the deformable film into the shape of either concave, plane, or convex, the shape of the conversion lens can be changed continuously from the concave lens to convex lens, and vice versa.

According to a further embodiment, there is provided an imaging device including an imaging device body having an optical system and a conversion lens system mounted on the object side of the optical system of the imaging device body. The conversion lens system includes a conversion lens and a curvature control device. The conversion lens includes a pair of transparent members, at least one thereof being formed of a deformable film; a connecting member for connecting the pair of transparent members to form a sealed space sandwiched between the pair of transparent members; a transparent liquid filled in the sealed space; and a curvature changing mechanism for changing the curvature of the deformable film by moving the transparent liquid filled in the sealed space. The curvature control device is configured to control the change of the curvature of the deformable film by controlling the curvature changing mechanism.

With the imaging device according to the embodiment, the conversion lens, which constitutes the conversion lens system mounted onto imaging device body, can be changed as desired into the shape of concave, plane, or convex lens. With the imaging device of the embodiment, therefore, the photography of the wide, standard, and macro mode becomes feasible.

According to the embodiments, it becomes feasible to switch over among the wide-angle, standard, or macro mode of photography with the conversion lens being attached to the imaging device body, without any concern of mounting/dismounting otherwise necessitated therewith.

Additional features and advantages are described herein, and will be apparent from the following Detailed Description and the figures.

BRIEF DESCRIPTION OF THE FIGURES

Embodiments will be described in detail with reference to the following drawings, wherein.

DETAILED DESCRIPTION

Figure 1:
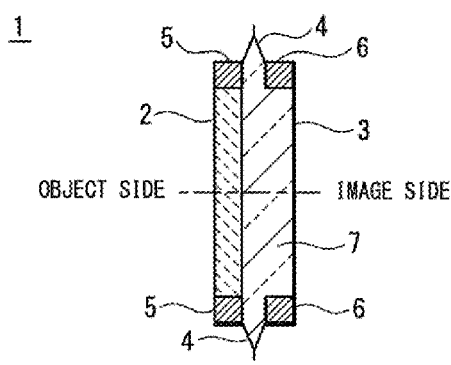
FIG. 1 is a cross-sectional view generally illustrating a configuration of a first example of a conversion lens according to an embodiment.

FIG. 1 is a cross-sectional view generally illustrating a configuration of a first example of a conversion lens according to an embodiment. Referring to FIG. 1, a conversion lens 1 according to the first example includes a pair of transparent members formed of a first transparent member 2 of a plane solid plate and a second transparent member 3 of a deformable film, and a transparent liquid 7 filling a space hermetically sealed at least by the pair of transparent members. Of the pair of transparent members in the conversion lens 1 of this example, the first transparent member 2 is configured to serve as the face directed to the side of object, while the second transparent member 3 is to serve as the face directed to the side of image. Therefore, the conversion lens 1 is herein formed as an example of the compound type doublet lens formed of the plane solid plate for forming the first transparent member 2 and the transparent liquid 7 having the deformable film as its surface boundary, in which the deformable film is included in the second transparent member 3.

The plane solid plate as the first transparent member 2 is formed with transparent materials having suitable light transparency such as, for example, glass, acrylics, plastics, etc., which are each formed as double-sided plates.

In addition, the deformable film for forming the second transparent member 3 is formed, for example, with elastomer films having suitable elasticity to be a transparent film having suitable light transparency. Suitable examples for use in forming the deformable film may include silicone rubber, fluorine-containing rubber, and urethane rubber.

A connecting member 4 is provided to connect the first transparent member 2 and second transparent member 3 on the periphery thereof so as to form a sealed space sandwiched between the first transparent member 2 and second transparent member 3. The connecting member 4 is configured to connect the first transparent member 2 and second transparent member 3 so as to hermetically retain the liquid 7 filled into the sealed space. In addition, in this example, the connecting member 4 is formed as a bellows structure having elastic pleats, and this bellows structure may be formed by superposing flexible sheets, which are formed with thin air-tight aluminum foils laminated with resinous material such as polyethylene, etc., by heat-sealing, for example.

As the liquid 7 filled in the sealed space, a transparent liquid body having suitable light transparency may be used such as silicone oil having low volatility, for example. In addition, the amount of the liquid 7 filled in the sealed space is adjusted to maintain the deformable film formed with the second transparent member 3 to be a plane.

Moreover, with the first transparent member 2 and the second transparent member 3 thus connected by the connecting member 4, a first periphery of the face directed to the object side included in the first transparent member and a second periphery of the face directed to the image side included in the second transparent member, are fixed with a first frame body 5 and second frame body 6, respectively. Accordingly, a liquid lens is formed with the structure surrounded by the abovementioned second frame body 6, as the major portion of the conversion lens 1 according to this example.

The thus constructed conversion lens 1 is retained so that its deformable film as the second transparent member 3 is normally held flat, as shown in FIG. 1. And with the conversion lens 1 according to this example, it is feasible to change the curvature of second transparent member 3 included in the conversion lens 1, by fixing one of the first frame body 5 and second frame body 6, and then either pulling or pushing the other of the frame bodies 5 and 6, which is not fixed presently.

Figure 2:
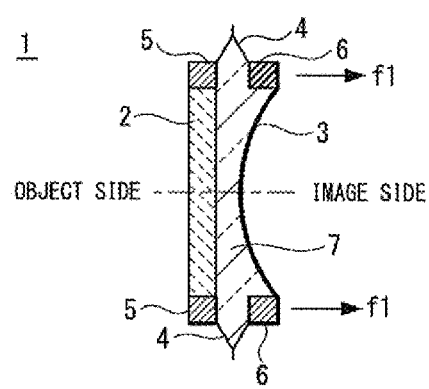
FIG. 2 is another cross-sectional view illustrating a configuration of the first example of the conversion lens according to an embodiment.

For example, as shown in FIG. 2, the first frame body 5 is fixed and the second frame body 6 is pulled in the drawing page in the direction indicated by the arrow f1. It follows that the connecting portion of bellows structure is stretched and the shape of the second transparent member 3 in the region surrounded by the second frame body 6 is transformed to be concave, as a result.

That is, since the volume of the liquid 7 filling the sealed space is fixed, some part of the liquid 7 moves toward the periphery by increasing the interval between the first frame body 5 and second frame body 6. As a result, the volume of the liquid 7 decreases at the center portion of the region surrounded by the first and second frame bodies 5 and 6. In this case, since the first transparent member 2 is formed of plane solid plate, as mentioned earlier, the second transparent member 3 formed of deformable film is transformed into the concave shape, as shown in FIG. 2. Accordingly, the conversion lens 1 comes to serve as a concave conversion lens.

Figure 3:
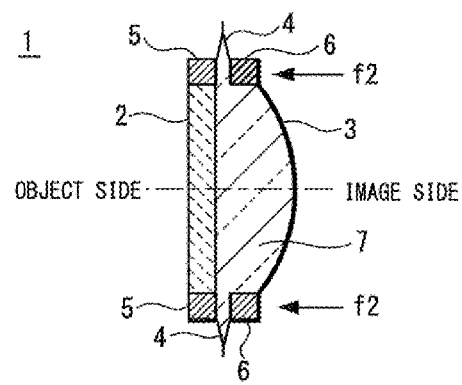
FIG. 3 is still another cross-sectional view illustrating a configuration of the first example of the conversion lens according an embodiment.

In the next place, on the contrary, one of the first frame body 5 and second frame body 6 is fixed, the other of the frame bodies 5 and 6 is pushed, which is not fixed presently. For example, as shown in FIG. 3, the first frame body 5 is fixed and the second frame body 6 is pushed toward the direction shown by the arrow f2. It follows that the connecting portion of bellows structure is retracted and the shape of the second transparent member 3 in the region surrounded by the second frame body 6 is transformed to be convex, as a result. That is, since the volume of the liquid 7 filling the sealed space is fixed, some part of the liquid 7 moves toward the center of the region surrounded by the first and second frame bodies 5 and 6 by retracting the interval between the first frame body 5 and second frame body 6. In this case, since the first transparent member 2 is formed of plane solid plate, the second transparent member 3 formed of deformable film is transformed into the convex shape, as shown in FIG. 3. Thereby, the conversion lens 1 comes to serve as a convex conversion lens.

Accordingly, with the conversion lens 1 of this example, it becomes feasible to change the curvature of second transparent member 3 formed of the deformable film surrounded by the second frame body 6, by fixing any one of the first frame body 5 and second frame body 6, and then either pulling or pushing the other of the frame bodies 5 and 6.

Therefore, a curvature changing mechanism is provided, including the first frame body 5, second frame body 6, and the connecting member 4 with bellows structure in the first example.

The above-mentioned conversion lens 1 of the first example may suitably be utilized by being mounted in front of the optical system included in the main body of various imaging devices such as still cameras, video camcorders, etc.

In the next place, several images will be described along operating status of the conversion lens 1, in which the images can be photographed by the imaging devices provided with the conversion lens 1 of this example mounted on the main body of the imaging device. The conversion lens 1 is herein loaded on the main body of imaging device so that the first transparent member 2 is on the object side and the second transparent member 3 is on the image side.

FIGS. 4A through 4D show images photographed using the conversion lens 1 of this example loaded on the main body of imaging device. For example, these images are examples in the case where the conversion lens 1 is loaded on the main body of imaging device having 10 times zooming function.

Figure 4:
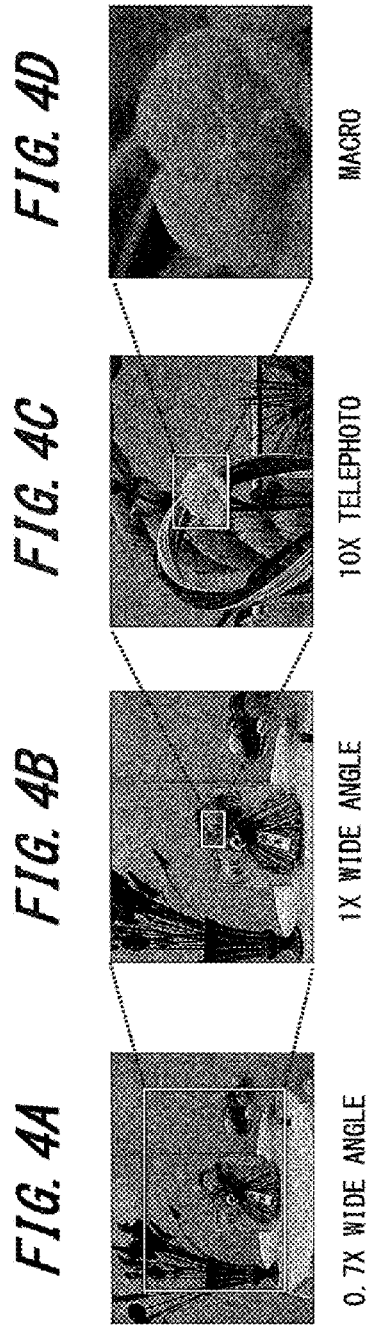
FIGS. 4A through 4D show images which can be photographed using the first example of the conversion lens according to an embodiment.

First, the images shown in FIGS. 4B and 4C are photographed with the second transparent member 3 in the conversion lens 1 held as a flat plate. Specifically, when these images are photographed as shown in FIGS. 4B and 4C, the second transparent member 3 in the conversion lens 1 does not have any curvature. The image of FIG. 4B is photographed with the optical system, which is included in the main body of the imaging device, at wide angle end, i.e., the minimum focal length. The image of FIG. 4C is photographed with the optical system included in the main body of the imaging device, at telephoto end (with 10 times telephoto function in the present example), i.e., the maximum focal length. Reiterating the earlier part of results for purposes of comparison, in the case where the second transparent member 3 in the conversion lens 1 is held as flat plate, since the second transparent member 3 in the conversion lens 1 does not have any curvature, the images photographed using the imaging device are the same as those photographed without loading the conversion lens 1. Therefore, FIGS. 4B and 4C are the images photographed with the main body of imaging device having the normal focal length range thereof.

Next, the image shown in FIG. 4A is photographed by setting the focal length at the wide angle end for the optical system included in the main body of imaging device, and then deforming the deformable film as the second transparent member 3 of the conversion lens 1, to be in the concave shape, as shown in FIG. 2. By deforming the deformable film as the second transparent member 3 of the conversion lens 1, to be in the concave shape by setting the main body of imaging device at its maximum wide-mode value, the imaging angle can be extended further to 0.7 time wide angle. In this case, therefore, the conversion lens 1 serves as the wide end convertor.

In addition, the image shown in FIG. 4D is photographed by setting the focal length for the main body of imaging device at 10 times telephoto mode, or at the telephoto end, and then deforming the deformable film as the second transparent member 3 of the conversion lens 1, to be in the convex shape, as shown in FIG. 3. In this example, by deforming the deformable film as the second transparent member 3 of the conversion lens 1 into the convex shape at the telephoto end of the main body of imaging device, the macro mode photography becomes feasible. In this case, therefore, the conversion lens 1 plays the function of the close-up lens.

As described hereinabove, when the conversion lens 1 of this example is mounted in front of the optical system included in the main body of imaging device, the switching over among the wide angle, standard, or macro mode of photography becomes feasible without demounting the conversion lens 1 from the main body of imaging device.

Figure 5:
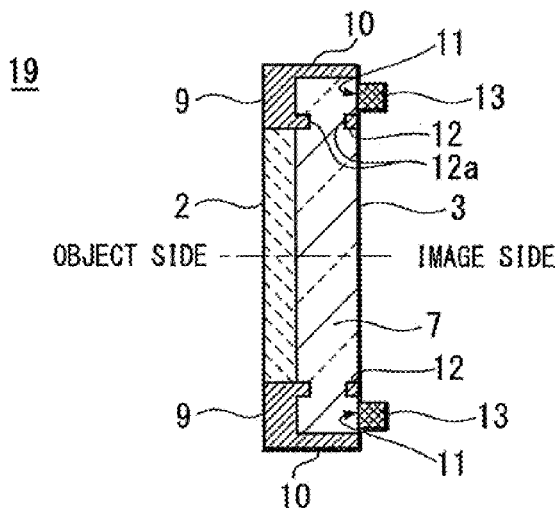
FIG. 5 is a cross-sectional view generally illustrating a configuration of a second example of a conversion lens according to an embodiment.

In the next place, FIG. 5 is a cross-sectional view generally illustrating a configuration of a second example of a conversion lens according to an embodiment. The components and units shown in FIG. 5 similar to those included in FIG. 1 are shown with identical numerical representations and the repeated description thereof is abbreviated herein.

First, a conversion lens 19 according to the second example is provided, including a connecting member 10 which is configured to connect a first transparent member 2 and second transparent member 3, and is formed integrally with a frame body 9 on the periphery of the first transparent member 2. In addition, the periphery of the second transparent member 3 constitutes a diaphragm 11. In the second transparent member 3, and on the boundary between the major portion thereof constituting a liquid lens and the peripheral portion constituting the diaphragm 11, a partition plate 12 is provided on the side in contact with the liquid 7 included in the second transparent member 3, and then a part of the partition plate 12 is provided with an opening 12a. In addition, a supporting member 13 is further provided on the face of the second transparent member 3 constituting the diaphragm 11.

The partition plate 12 is formed so as not to completely divide the liquid 7, which is filling the sealed space, into the liquid in the peripheral portion constituting the diaphragm 11 and the liquid in the major portion of the second transparent member 3 constituting the liquid lens. The liquid 7 is allowed to move between the peripheral portion of the sealed space and the major portion, because the opening 12a is provided. In addition, the partition plate 12 is formed partially connected to the connecting member 10. The diaphragm 11 may be formed integrally with the second transparent member 3.

Alternatively, it may be formed separately with another flexible material. As for the conversion lens 19 of this example, therefore, a curvature changing mechanism is provided, including the diaphragm 11 and supporting member 13.

With the conversion lens 19 of this example, the flexible diaphragm 11 is either pulled or pushed by pulling or pushing the supporting member 13, thereby resulting in the change of the curvature of second transparent member 3.

Figure 6:
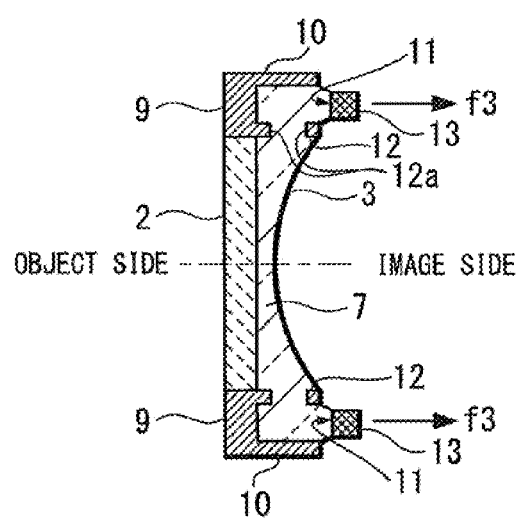
FIG. 6 is another cross-sectional view illustrating a configuration of the second example of the conversion lens according to an embodiment.

For example, as shown in FIG. 6, when the supporting member 13 is pulled in the direction indicated by an arrow B3, it follows that a part of the liquid 7 filling the sealed space moves from the major portion of the conversion lens 19 to the peripheral portion through the opening 12a of the partition plate 12. As a result, the surface of second transparent member 3 bends to be concave with the partition plate 12 as a fulcrum. Since the partition plate 12 is partially connected with the connection part 10, the fixed state is maintained for the partition plate 12 when the diaphragm 11 is pulled. As a result, the partition plate 12 can serve as the fulcrum for deforming the deformable film of the second transparent member 3. Accordingly, the conversion lens 19 comes to serve as a concave conversion lens.

Figure 7:
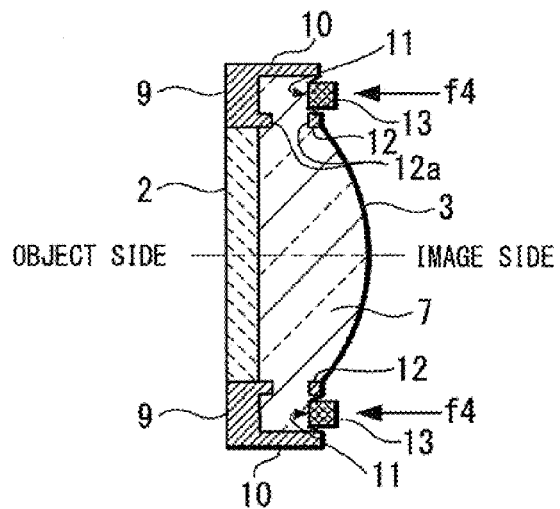
FIG. 7 is still another cross-sectional view illustrating a configuration of the second example of the conversion lens according to an embodiment.

Moreover, as shown in FIG. 7, when the supporting member 13 is pushed in the direction indicated by an arrow f4, it follows that a part of the liquid 7 filling the sealed space moves away from the peripheral portion to the major portion of the conversion lens 19 through the opening 12a of the partition plate 12. As a result, the surface of second transparent member 3 bends to be convex with the partition plate 12 as a fulcrum. Accordingly, the conversion lens 19 comes to serve as a convex conversion lens.

In a manner similar to the aforementioned conversion lens 1 of the first example, the conversion lens 19 according to this example may also be utilized by being mounted in front of the optical system included in the main body of various imaging devices such as still cameras, video camcorders, etc. Also with the conversion lens 19 of this example, for carrying out the wide angle mode photography at the wide angle end of the main body of imaging device, as shown in FIG. 6, the supporting member 13 is pulled and the conversion lens 19 is brought into the shape of concave lens. Further, for carrying out the macro mode photography at the telephoto end of the main body of imaging device, as shown in FIG. 7, the supporting member 13 is pushed and the conversion lens 19 is brought into the shape of convex lens. In addition, for carrying out the standard mode photography, no force is applied to the supporting member 13 of the conversion lens 19, as shown in FIG. 5, and the second transparent member 3 is configured to be held as flat plate.

As described hereinabove, when the conversion lens 19 of this example is mounted on the main body of imaging device, the flexible diaphragm 11 is either pulled or pushed by appropriately adjusting the force applied to the supporting member 13. As a result, the curvature of second transparent member 3 of the conversion lens 19 is changed and switching over among the wide-angle, standard, or macro mode of photography is carried out. With the conversion lens 19 as well, the switching over among the wide-angle, standard, or macro mode of photography becomes feasible without demounting the conversion lens 19 from the main body of imaging device, in a manner similar to the first example mentioned earlier.

Figure 8:
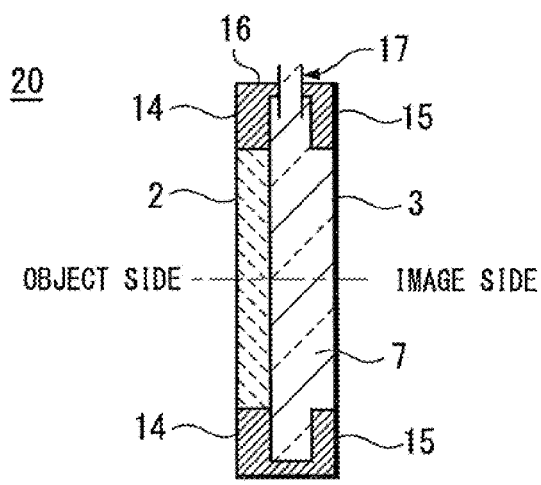
FIG. 8 is a cross-sectional view generally illustrating a configuration of a third example of a conversion lens according to an embodiment.

In the next place, FIG. 8 is a cross-sectional view generally illustrating a configuration of a third example of a conversion lens 20 according to an embodiment. The components and units shown in FIG. 8 similar to those included in FIGS. 1 and 5 are shown with identical numerical representations and the repeated description thereof is abbreviated herein.

The conversion lens 20 according to this example is provided, including a connecting member 16 which is configured to connect a first transparent member 2 and second transparent member 3, formed integrally with a first frame body 14 formed on the periphery of the first transparent member 2 and a second frame body 15 formed on the periphery of the second transparent member 3. In a manner similar to the first example, the first frame body 14 and second frame body 15 are provided, being fixed to the peripheral portions of the face directed to the object side of the first transparent member 2 and of the face directed to the image side of the second transparent member 3, respectively. In addition, in this example, a liquid movable part 17 is formed having a tabular shape as a portion of the connecting member 16. This liquid movable part 17 is provided for enabling the movement of the liquid 7 filling the sealed space, and the movement of the liquid 7 is controlled, for example, by driving an external pumping mechanism, etc (not shown). Accordingly, the curvature changing mechanism of this example is provided, including the liquid movable part 17.

In this example, by driving the external pumping mechanism and transferring the liquid 7 filling the sealed space using the pumping mechanism, the volume of the liquid 7 filling the sealed space can be changed. As a result, the curvature of the second transparent member 3 provided with the deformable film, can be changed.

Figure 9:
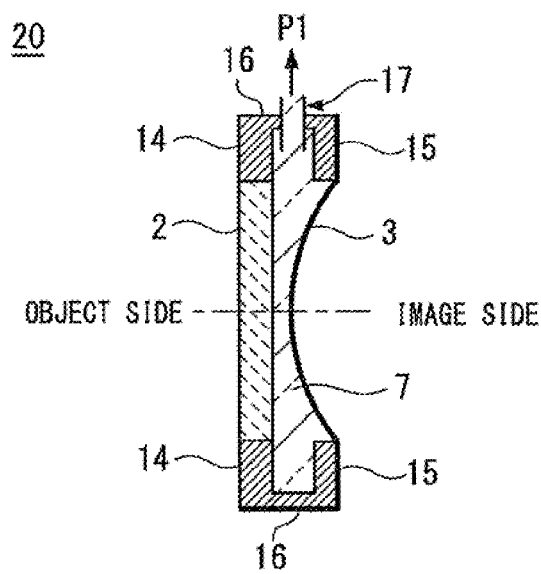
FIG. 9 is another cross-sectional view illustrating a configuration of the third example of the conversion lens according to an embodiment.

For example, by driving the external pumping mechanism, as shown in FIG. 9, a portion of the liquid 7 filling the sealed space is transferred in the direction indicated by an arrow p1. It follows that the volume of the liquid 7 filling the sealed space decreases, and that the shape of the second transparent member 3 provided with the deformable film is transformed to be concave. Accordingly, the conversion lens 20 comes to serve as a concave conversion lens.

Figure 10:
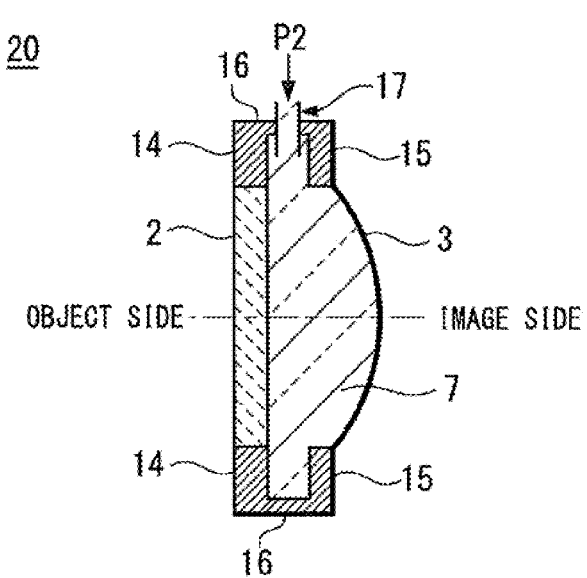
FIG. 10 is still another cross-sectional view illustrating a configuration of the third example of the conversion lens according to an embodiment.

In contrast, as shown in FIG. 10, a portion of the liquid 7 filling the sealed space is transferred in the direction indicated by an arrow p2 by driving the external pumping mechanism. It follows that the volume of the liquid 7 filling the sealed space increases by inletting some of the liquid 7, and that the shape of the second transparent member 3 provided with the deformable film is transformed to be convex. Accordingly, the conversion lens 20 comes to serve as a convex conversion lens.

The conversion lens 20 according to this example may also be utilized, in a manner similar to the aforementioned conversion lenses 1 and 19 of the first and second examples, respectively, by being mounted in front of the optical system included in the main body of various imaging devices such as still cameras, video camcorders, etc. Also with the conversion lens 20 of this example, for carrying out the wide angle mode photography at the wide angle end of the main body of imaging device, as shown in FIG. 9, the conversion lens 20 is brought to serve as the concave conversion lens by decreasing the volume of the liquid 7 in the sealed space. Further, for carrying out the macro mode photography at the telephoto end of the main body of imaging device, as shown in FIG. 10, the conversion lens 20 is brought to serve as the convex conversion lens by increasing the volume of the liquid 7 in the sealed space. In addition, for carrying out the standard mode photography, the second transparent member 3 is configured to be held as flat plate by suitably controlling the volume of the liquid 7.

As described hereinabove, when the conversion lens 20 of this example is mounted on the main body of imaging device, by suitably transferring the liquid 7 in the sealed space through the liquid movable part 17 and thereby changing the curvature of second transparent member 3 of the conversion lens 20, the switching over is carried out among the wide-angle, standard, or macro mode of photography. Therefore, with the conversion lens 20 of this example as well, the switching over among the wide-angle, standard, or macro mode of photography becomes feasible without demounting the conversion lens 20 from the main body of imaging device, similarly to the first and second examples mentioned earlier.

Figure 11A:
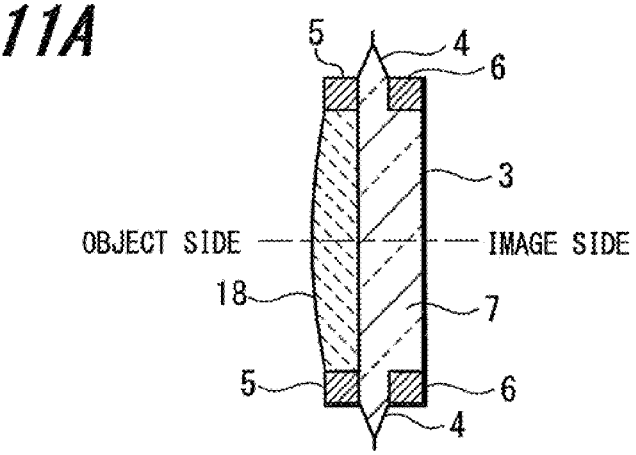
FIG. 11A is a cross-sectional view illustrating a modification to the conversion lens of FIG. 1.
Figure 11B:
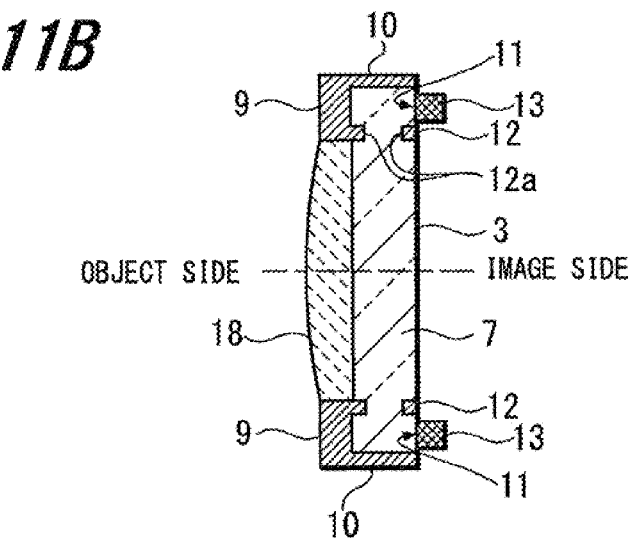
FIG. 11B is a cross-sectional view illustrating a modification to the conversion lens of FIG. 5.
Figure 11C:
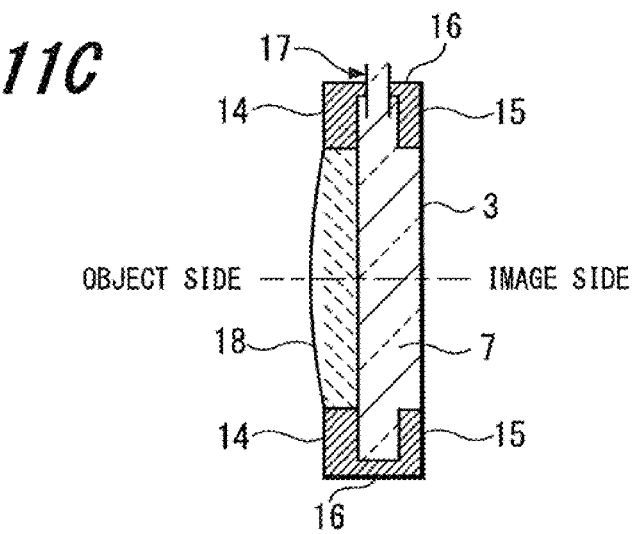
FIG. 11C is a cross-sectional view illustrating a modification to the conversion lens of FIG. 8.

Although the first transparent member 2 is assumed as two-sided flat solid plate in the first through third examples, a first transparent member may alternatively be formed as a solid lens 18 having a convex curvature on the side of the object, for example, as shown in FIGS. 11A through 11C. FIG. 11A illustrates such a modification to the conversion lens 1 of FIG. 1, FIG. 11B the modification to the conversion lens 19 of FIG. 5, and FIG. 11C the modification to the conversion lens 20 of FIG. 8.

As illustrated in FIGS. 11A through 11C, the aberration, for example, of the image to be photographed can be reduced by forming the first transparent member with the solid lens 18 having a desirable shape. Moreover, a first transparent member may be formed including the deformable film in a manner similar to the second transparent member 3. Specifically, in the conversion lens according to an embodiment, it is preferable as long as at least one of the transparent member pairs is formed with a deformable film, and various combinations can possibly be adapted depending on lens design, as a result.

The conversion lenses 1, 19, and 20 described above according to the first through third examples can be used by being mounted in front of the main body of imaging device, in practice, as conversion lens systems provided with a curvature control device for controlling the curvature changing mechanisms.

Next, specific examples will be described hereinbelow on the configurations of several conversion lens systems which are each formed as the conversion lenses provided with curvature changing mechanisms.

Figure 12:
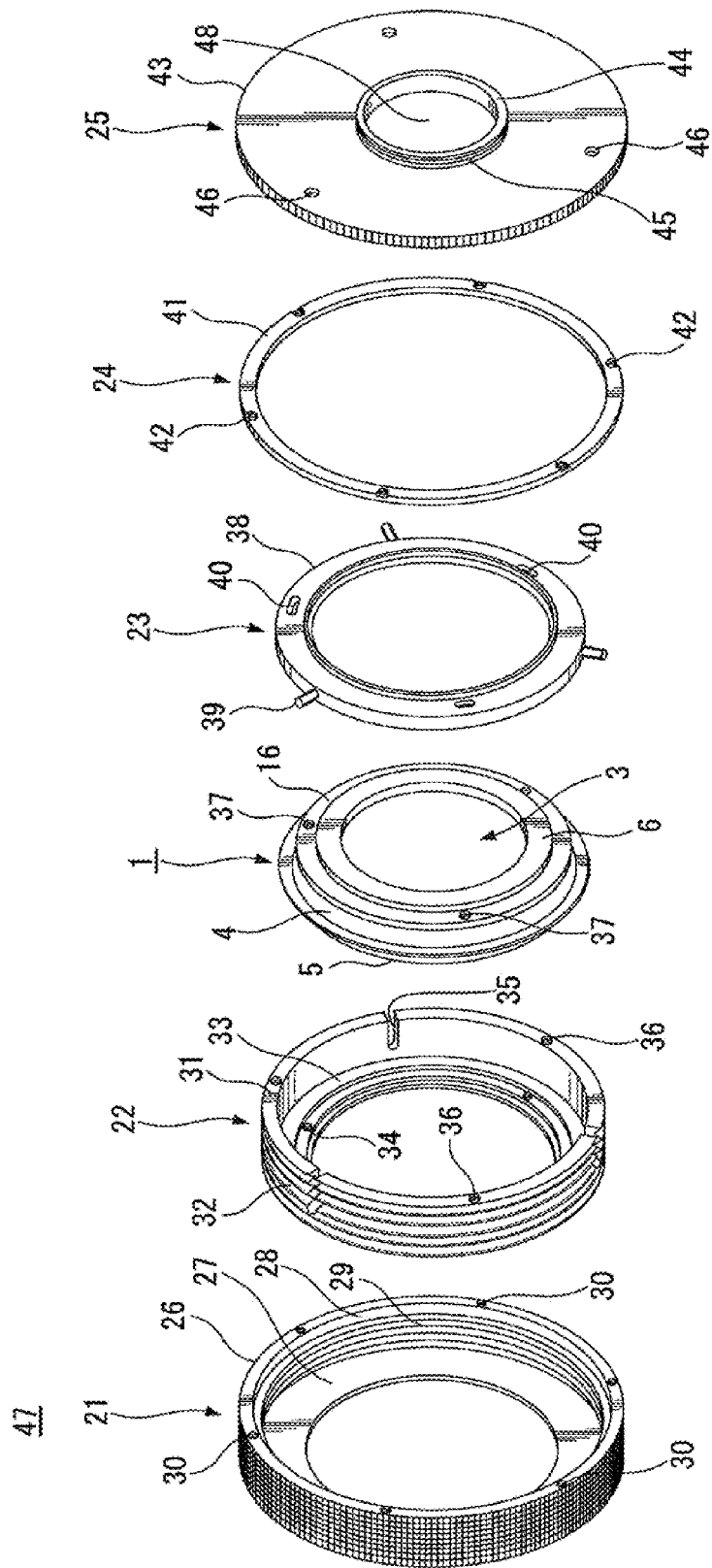
FIG. 12 is an exploded view generally illustrating a conversion lens system according to an embodiment.
Figure 13:
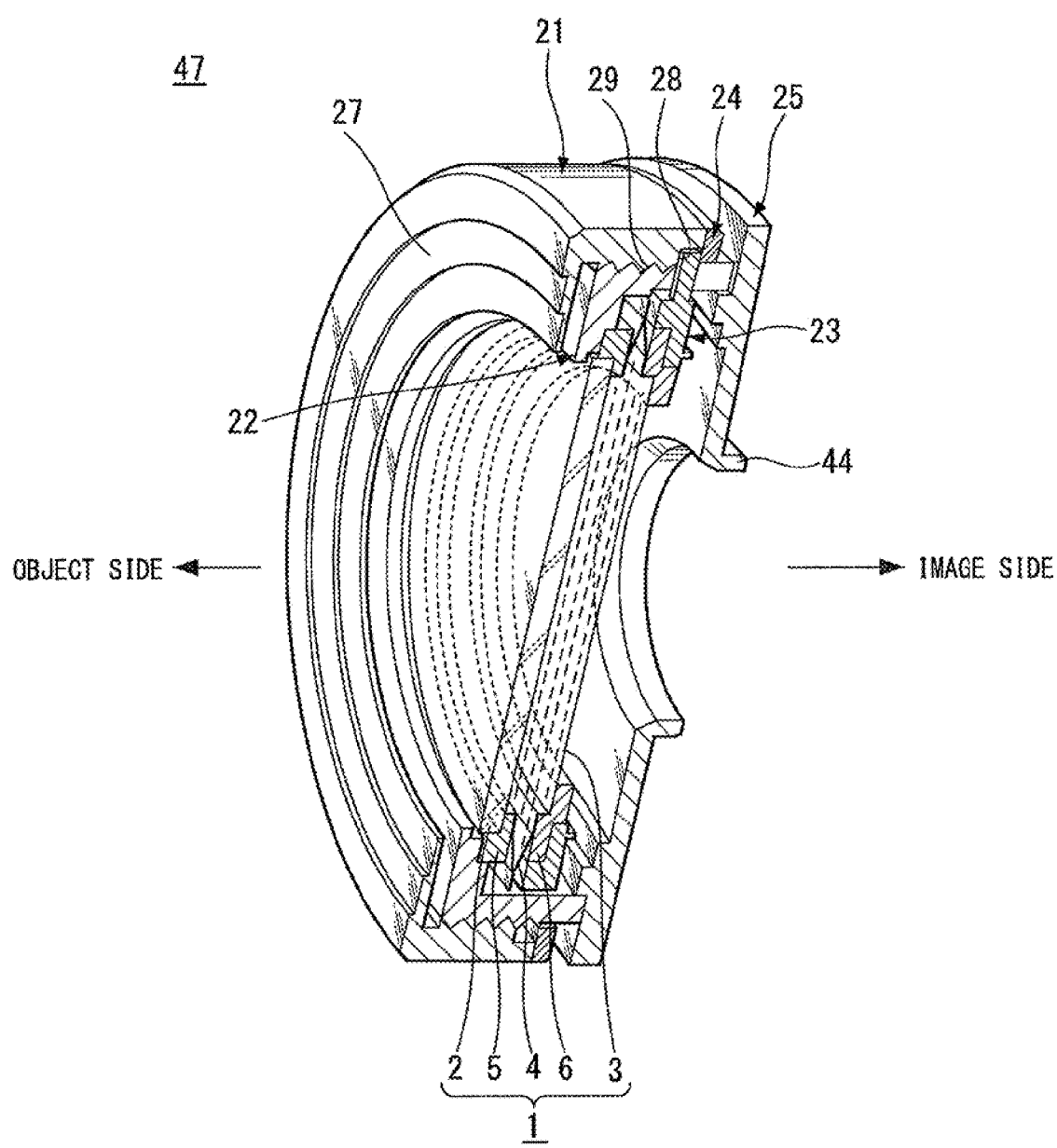
FIG. 13 is a cross-sectional view schematically illustrating the conversion lens system according to an embodiment.

Referring to FIGS. 12 and 13, an example of a conversion lens system according to an embodiment is described, which is provided with the conversion lens 1 of the aforementioned first example. As typically illustrated with the conversion lens 1 of the first example, a conversion lens system 47 of this example is such a system that can suitably be adapted to the aforementioned configuration including the connecting member having bellows structure as the curvature changing mechanism. FIG. 12 is an exploded view generally illustrating the conversion lens system 47 and FIG. 13 is a cross-sectional view schematically illustrating the conversion lens system 47 when assembled.

The conversion lens system 47 according to this example is provided, including a curvature control device having an adjusting ring 21, a lens frame 22, a movable plate 23, a movable plate securing ring 24, and a main body attaching member 25, and including the conversion lens 1. In the drawing page of FIG. 12, assumed herein are the object side on left and the image side on right. Specifically, the side of main body attaching member 25 is assumed to be the side which is brought into contact, when mounting, with the front face of the optical system included in the main body of imaging device.

The adjusting ring 21 has a cylinder part 26 and a flange part 27 formed at the end of the cylinder part 26 on the object side. The flange part 27 is formed integrally with the cylinder part 26 to be extended in the inner direction. A step part 28 is formed on the inner surface of the cylinder part 26 from the edge on the image side toward the object side for mounting the movable plate 23. The step part 28 serves as a sliding surface for movable plate 23, as will be described later on. In addition, a threaded part 29 is formed on the inner surface of the cylinder part 26 from the step part 28 toward the object side. Moreover, screw holes 30 are provided at fixed angular intervals on the end face on the object side.

The lens frame 22 has a cylinder part 31 and a flange part 33 formed on the end face of the cylinder part 31 on the object side toward the inner direction so as to form steps. On the outer face of the cylinder part 31, a threaded part 32 is formed, which is configured to be screwed into the threaded part 29 formed on the adjusting ring 21. In addition, grooves 35 are formed in the cylinder part 31 from the end of the object side extending in the direction of optical axis, and these grooves 35 in the cylinder part 31 are formed at three locations at fixed angular intervals in this example. In addition, screw holes 34 for fixing the conversion lens 1 on the inner face of the flange part 33 and further screw holes 36 for fixing the main body attaching member 25 on the end face of the cylinder part 31 on the image side are provided respectively at fixed angular intervals.

The conversion lens 1 used in this example is the aforementioned conversion lens 1 shown in FIG. 1. In the conversion lens 1 used in the conversion lens system 47, therefore, the components and units thereof similar to those included in FIG. 1 are shown with identical numerical representations and the repeated description thereof is abbreviated herein. On the first frame body 5 of the conversion lens 1, screw holes are provided (not shown) for fixing the frame body 5 onto the lens frame 22 through the corresponding screw holes 34 which are provided on the flange part 33 of lens frame 22 mentioned above. In addition, on the second frame body 6 of the conversion lens 1, screw holes 37 are provided for fixing a movable plate 23 which will be described herein below.

The movable plate 23 is provided, including a ring part 38 formed in the shape of ring, and support pins 39 provided in protruding conditions on the outside edge of ring part. These support pins 39 are each provided to engage with the grooves 35 formed in the cylinder part 31 of lens frame 22, and mounted on the step part 28 of adjusting ring 21, and the upper portion of the step part 28 serves as sliding surfaces of the support pins 39. At this point, the end face on the image side, of the cylinder part 26 of the adjusting ring 21 is flush with the movable plate 23. In addition, screw insertion holes 40 are formed at several locations on the ring part 38 of movable plate 23 so as to correspond to the screw holes 37 of the second frame body 6 of the conversion lens 1. The movable plate 34 and conversion lens 1 are fixed by fitting the screws into the screw holes 37 of the second frame body 6 through the screw insertion holes 40.

The movable plate securing ring 24 is formed in the shape of ring having the same diameter as the adjusting ring 21, and screw insertion holes 42 are formed on the periphery thereof at the locations corresponding to the screw holes 30 formed on the adjusting ring 21. In addition, the movable plate securing ring 24 is formed having its ring width slightly larger than the thickness of the cylinder part 26 of the adjusting ring 21 so as to protrude toward the inner direction of the adjusting ring 21. With such a configuration, the movable plate 23 mounted on the step part 28 of adjusting ring 21 can be fixed by the movable plate securing ring 24 so as not to slide out much toward the image side. Specifically, the movable plate 23 is sandwiched and held between the sliding surface of the step part 28 of adjusting ring 21 and the movable plate securing ring 24.

The main body attaching member 25 is formed including a disk part 43 having a circular opening 48 in the center thereof, and a protrusion part 44 having the edge of the central circular opening 48 protruded toward the image side, and a screw thread 45 is provided on the outer circumference of the protrusion part 44. The screw thread 45 formed on the outer circumference of the protrusion part 44 is placed in front of the optical system included in the main body of imaging device, i.e., on the image side. In addition, the circular opening 48 is provided according to the shape of the lens included in the optical system in the main body of imaging device, and the diameter of the disk part 43 is formed having the same size as that of the adjusting ring 21. Screw insertion holes 46 are formed on the outer periphery of the disk part 43 at the locations corresponding to the screw holes 36 formed in the lens frame 22, and screws are each inserted into the screw holes 36 of lens frame 22 through the screw insertion holes 46. Accordingly, the main body attaching member 25 is fixed to the lens frame 22.

With the configuration mentioned above, the second transparent member 3 of the conversion lens 1 incorporated into the conversion lens system 47 is changed into the shape of either concave, plane, or convex, thereby allowing the conversion lens 1 to be either concave, plane, or convex lens, respectively.

Figure 14:
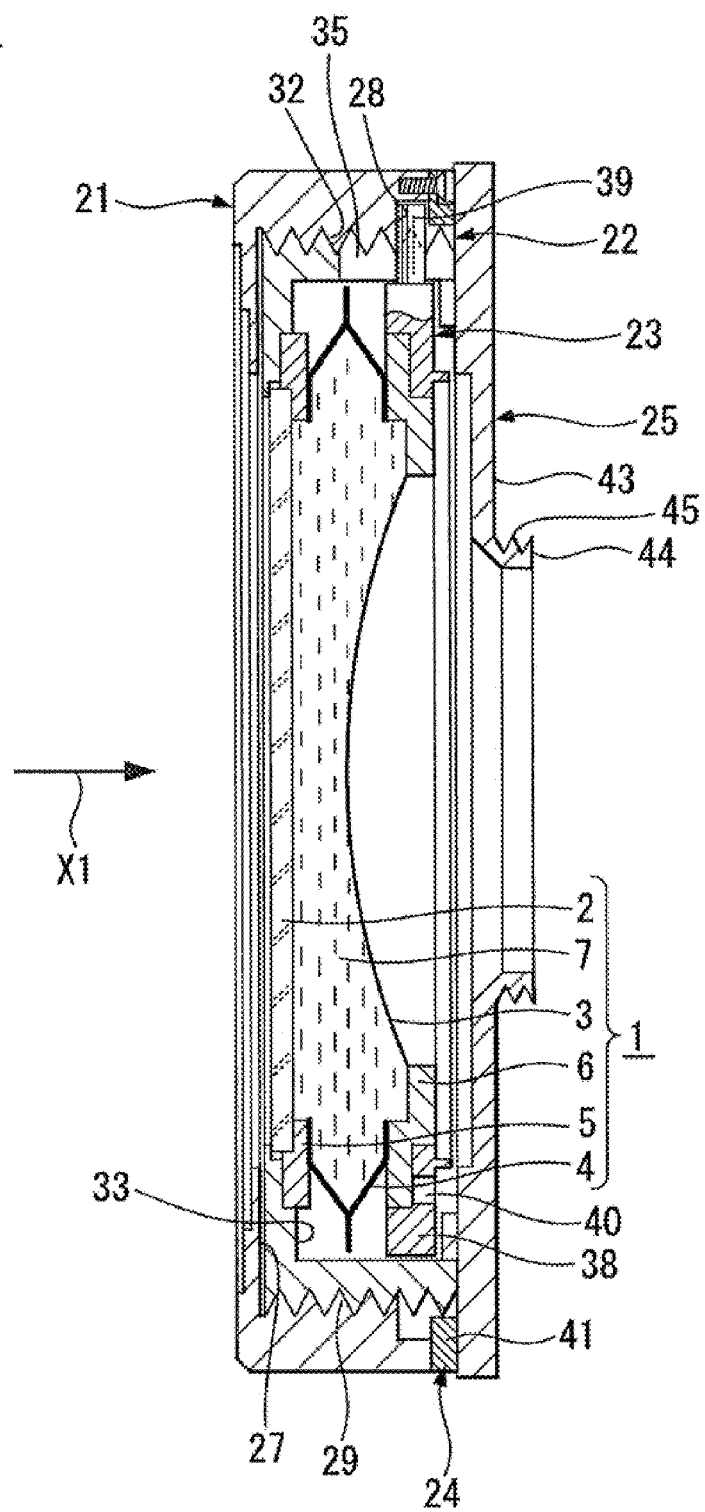
FIG. 14 is a cross-sectional view schematically illustrating the operation of the conversion lens system according to an embodiment, in which the adjusting ring is rotated in the direction so that the lens frame is screwed more on the adjusting ring.
Figure 15:
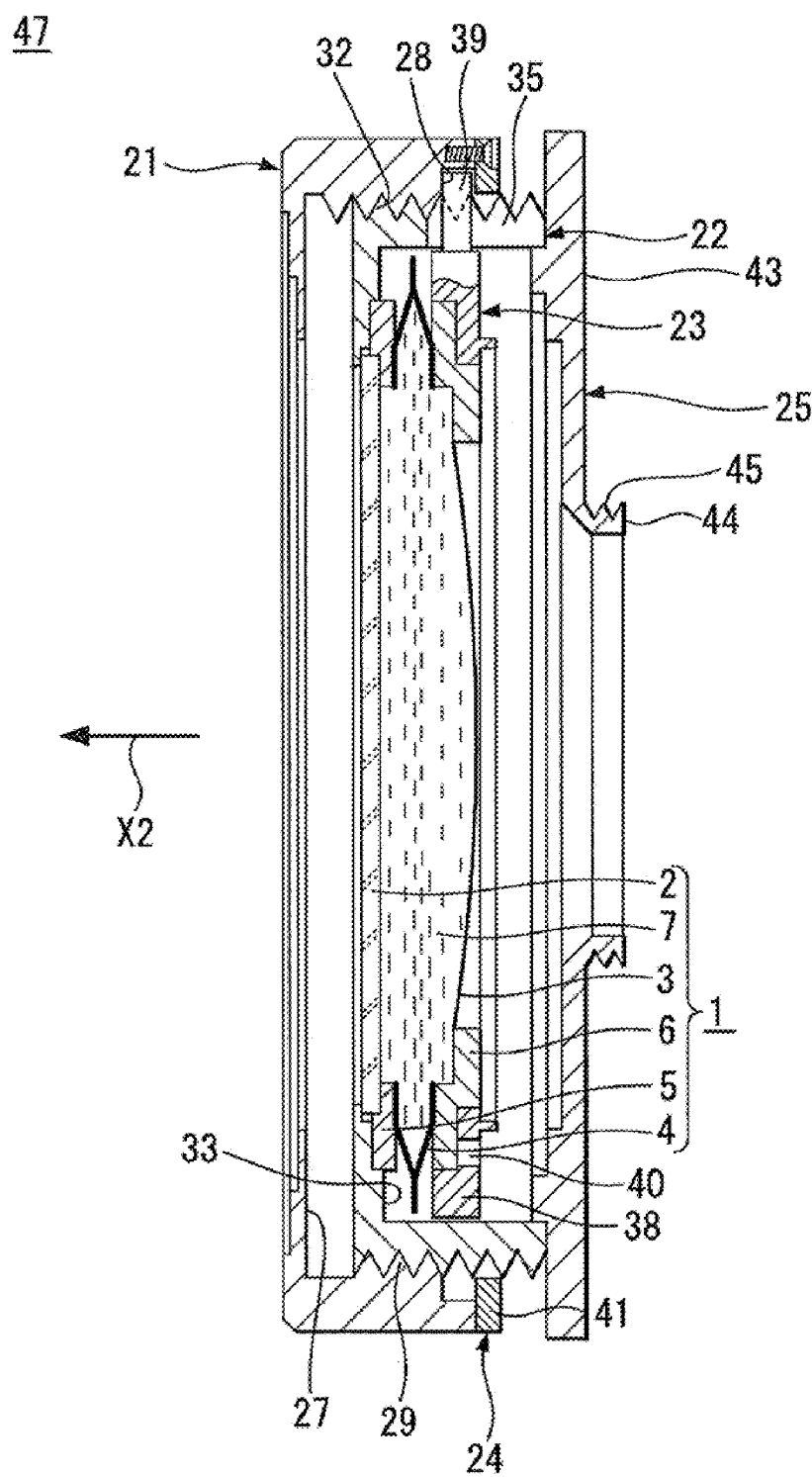
FIG. 15 is another cross-sectional view schematically illustrating the operation of the conversion lens system according to an embodiment, in which the adjusting ring is rotated in the direction so that the lens frame is screwed less on the adjusting ring.

Referring to FIGS. 14 and 15, the operation of the conversion lens system 47 according to the present embodiment will be described. The conversion lens system 47 of the present embodiment is provided, at least by mounting the main body attaching member 25 in front of the optical system in the main body of imaging device (on the side of objective lens). Since the lens frame 22 is fixed to the main body attaching member 25, this fixed configuration is maintained for the lens frame 22 as well, relative to the main body of imaging device.

In the conversion lens system 47 with the fixed configuration of the main body attaching member 25 according to the present embodiment, since the lens frame 22 is screwed into the adjusting ring 21, the adjusting ring 21 can be brought to be movable by rotating the adjusting ring 21, relative to the lens frame 22 in the direction of optical axis.

For example, FIG. 14 is a cross-sectional view schematically illustrating the configuration with the adjusting ring 21 rotated in the direction so that the lens frame 22 is screwed more, or in an increased amount, into the adjusting ring 21. The support pins 39 formed on the outer periphery of the movable plate 23 are configured to be sandwiched and held between the step part 28 on the adjusting ring 21 and the movable plate securing ring 24, and also to be engaged with the grooves 35 formed on the lens frame 22.

When the adjusting ring 21 in such configuration is rotated in the direction so that the lens frame 22 is screwed more into the adjusting ring 21, the sliding surface on the step part 28 of the adjusting ring 21 is brought to slide along the support pins 39 on the movable plate 23, and the sliding surface translates together with the movable plate 23 while sliding in the direction so as for the lens frame 22 to be screwed more, that is, the adjusting ring 21 moves in the direction indicated by an arrow x1 in the drawing page of FIG. 14. Since the support pins 39 are sandwiched and held between the step part 28 of adjusting ring 21 and the movable plate securing ring 24, the relative position between the adjusting ring 21 and the movable plate 23 does not change and the support pins 39 move along the inside of groves 35 formed on the lens frame 22. FIG. 14 illustrates an example case where the adjusting ring 21 is adjusted so that the support pins 39 are displaced further toward the image side from the middle of the grooves 35.

FIG. 14 illustrates the configuration in which the amount of the lens frame 22 being screwed into the adjusting ring 21 is maximum, where the position of the movable plate 23 is brought to be furthest relative to the flange part 33 of the lens frame 22. Since the conversion lens 1 is fixed to both the flange part 33 of the lens frame 22 and movable plate 23, the force in the direction indicated by an arrow f3 in the drawing page of FIG. 2 is applied to the second frame body 6 included in the conversion lens 1. As a result, the bellows structure of the conversion lens 1 stretches and the second transparent member 3 including the deformable film is transformed into the concave shape. That is, the conversion lens 1 with this configuration comes to serve as a concave conversion lens.

Next, FIG. 15 is a cross-sectional view schematically illustrating the configuration with the adjusting ring 21 rotated in the direction so that the lens frame 22 is screwed less, or in a decreased amount, into the adjusting ring 21. In this case, while the sliding surface on the step part 28 of the adjusting ring 21 is brought to slide along the support pins 39 on the movable plate 23, the adjusting ring 21 together with the movable plate 23 moves in the direction to decrease the amount of the lens frame 22 being screwed into the adjusting ring 21, i.e., in the direction indicated by an arrow x2. In addition, the support pins 39 are sandwiched and held between the step part 28 of adjusting ring 21 and the movable plate securing ring 24, the relative position between the adjusting ring 21 and the movable plate 23 does not change and the support pins 39 move along the inside of groves 35 formed on the lens frame 22. FIG. 15 illustrates another example case where the adjusting ring 21 is adjusted so that the support pins 39 are displaced further toward the object side from the middle of the grooves 35.

FIG. 15 illustrates the configuration in which the amount of the lens frame 22 being screwed into the adjusting ring 21 is minimum, where the position of the movable plate 23 is brought to be closest relative to the flange part 33 of the lens frame 22. Since the conversion lens 1 is fixed to both the flange part 33 of the lens frame 22 and movable plate 23, the force in the direction indicated by an arrow f4 in the drawing page of FIG. 3 is applied to the second frame body 6 included in the conversion lens 1. As a result, the bellows structure of the conversion lens 1 shrinks and the second transparent member 3 including the deformable film is transformed into the convex shape. That is, the conversion lens 1 with this configuration comes to serve as a convex conversion lens.

Moreover, in the present embodiment, the second transparent member 3 of the conversion lens 1 can be made into the shape of flat plate by suitably adjusting the amount of the lens frame 22 being screwed into the adjusting ring 21 and thereby bringing the configuration to the intermediate state between those shown in FIGS. 14 and 15.

With the conversion lens system 47 according to the present embodiment, the lens shape of the conversion lens 1 incorporated into the conversion lens system 47 can be changed readily between the concave and convex shapes by suitably adjusting the amount of the lens frame 22 being screwed into the adjusting ring 21 by rotating the adjusting ring 21. Also in the conversion lens system 47, the conversion lens 1 incorporated therein is configured to include the liquid lens, and the refractive index of the conversion lens 1 is changed by deforming the shape of the second transparent member 3 as deformable film. Therefore, since the shape of second transparent member 3 as the deformable film can be changed continuously from concave to convex and vice versa by adjusting the amount of the lens frame 22 being screwed into the adjusting ring 21, the continuous change of the refractive index of the conversion lens 1 becomes feasible.

In the present embodiment, although an example of using the conversion lens 1 having bellows structure is described hereinabove as the conversion lens incorporated into the conversion lens system, the conversion lens 19 shown in FIG. 5 may alternatively be used. When using the conversion lens 19, for example, it is preferable to fix the frame body 9 of the conversion lens 19 to the flange part 33 of the lens frame 22, and the supporting member 13 of this conversion lens 19 to the ring part 38 of movable plate 23. Furthermore, when using the conversion lens 20 shown in FIG. 8, a pumping mechanism may preferably be utilized as a curvature control device.

Figure 16:
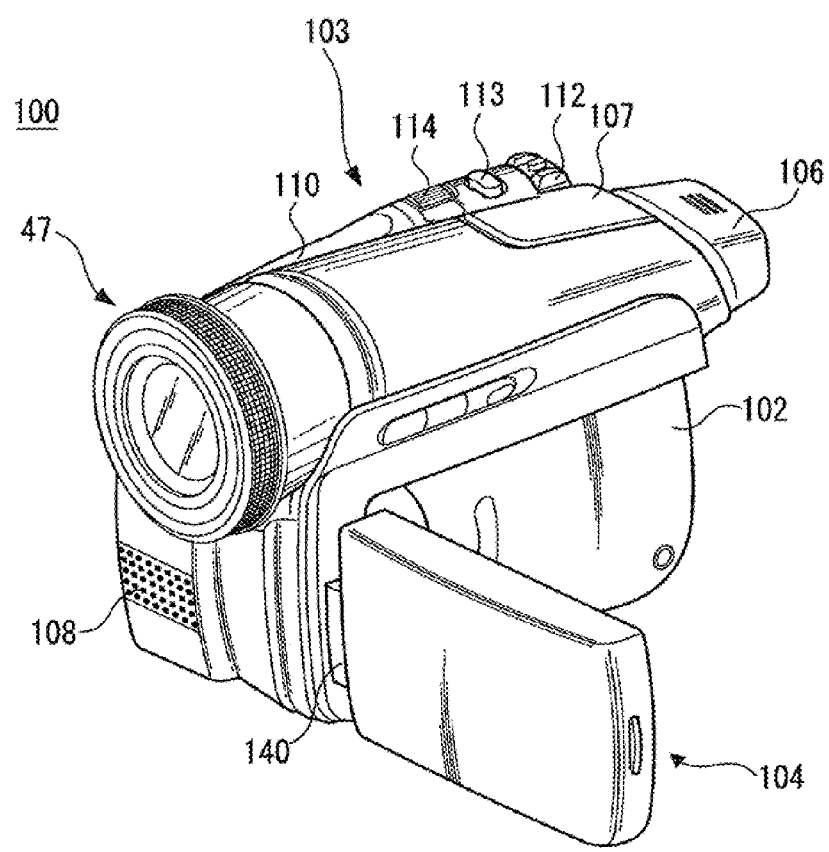
FIG. 16 is an external view schematically illustrating an imaging device according to an embodiment.

In the next place, referring to FIGS. 16 and 17, an imaging device will be described herein below, which includes the conversion lens system 47 of FIG. 12 mounted to the main body of imaging device. FIG. 16 is an external view schematically illustrating an imaging device 100 which may be exemplified by a digital video camcorder, for example.

The imaging device 100 shown in FIG. 16 is provided, including an imaging device body 103 provided with a lens barrel, an image sensor, drive control circuits, etc., each housed in the inside of a hollow case 102, and including the conversion lens system 47.

First, the case 102, which constitutes the imaging device body 103, is formed with a hollow enclosure of approximately rectangular-parallelepiped shape and horizontally long, and put into use placing its longer direction in the cross direction. Although not shown in FIG. 16, the case 102 is provided in its front with imaging lenses arranged in the lens barrel. The lens barrel is contained in the case 102 so that the optical axis of the optical system provided in the lens barrel is in the horizontal direction. In this example, the imaging lens in an optical system 51 (not shown in FIG. 16) is assumed to constitute a zoom lens. In the inside of the case 102 and in the rear of the lens barrel, the image sensor is provided, which will be described later on. In addition, in the rear of the lens barrel and on the back side of the case 102, a viewfinder unit 106 is provided.

An opening part is provided in the upper portion of the case 102 for exposing an accessory shoe (or hot shoe) to which several accessories such as an external video light, external microphone, etc are detachably mounted. The accessory shoe is placed in immediate front of the viewfinder unit 106 and normally covered detachably by a shoe cap 107 for opening and closing the opening part. Furthermore, a stereophonic microphone 108 is incorporated in the case 102 at the foreside bottom thereof. In addition, although not shown in the drawing, a light emitting part, which is integrally formed with the case 102, is provided at the foreside top of the lens barrel.

On one of side faces of case 102, a grip part 110 is provided for holding the case 102. This grip part 110 serves also as a cover member for covering a mechanism which is provided in the inside thereof (not shown). By opening outward the upper portion of the grip part 110, for example, a cassette loading slot is exposed for accessing the built-in mechanism, and attaching/detaching operations of tape cassettes, etc., can be carried out.

Furthermore, in the rear of, and above the a grip part 110, provided are a power switch 112 for serving also as a mode selection switch, a shutter button 113 for performing the still image photography, and a zoom button 114 for changing an image continuously by either expanding (telephoto) or reducing (wide) within a predetermined range. Furthermore, under the power switch 112, a record button is provided, although not shown in the drawing. Moreover, although not illustrated also, beside the record button and under the power switch 112, i.e., on the back side of the case 102, a battery storage compartment is provided for detachably mounting a battery unit serving as a portable power.

On the face opposite to the grip part 110 of the case 102, a display device 104 is attached attitude-changeably using a connecting member 140. The display device 104 is configured to function as, for example, a viewfinder and/or touch panel, which is formed with a liquid crystal panel, etc.

In addition, in front of the abovementioned optical system in the main body of imaging device, i.e., in front of the imaging lens, the conversion lens system 47 shown in FIG. 12 is attached. By screwing the screw thread 45, which is formed on the outer circumference of the protrusion part 44 included in the main body attaching member 25 of conversion lens system 47, into the screw, which is provided on the inner circumference of the front face of the imaging device body 103 where the imaging lens is exposed, the conversion lens system 47 is fixed to the imaging device body 103.

Figure 17:
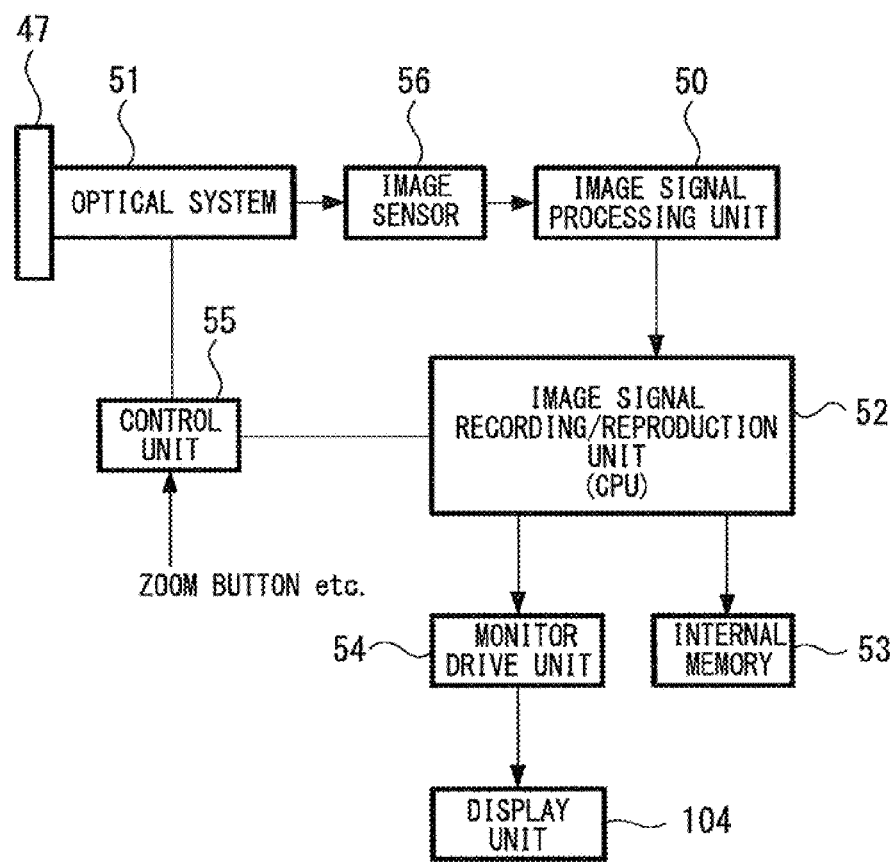
FIG. 17 is a block diagram illustrating the configuration of the major portions of the imaging device according to an embodiment.

FIG. 17 is a block diagram generally illustrating the configuration of the major portions of the imaging device 100. The imaging device 100 is provided, including the optical system 51; an image sensor 56 for outputting the signals obtained by carrying out photoelectric conversion of the light from the object to be photographed, that is the image formed through the optical system 51; an image signal processing unit 50 for processing the signals received from the image sensor 56; and an image signal recording/reproduction unit 52 for recording and reproducing the signals processed to be predetermined image signals by the image signal processing part 50.

The imaging lens included in the optical system 51 is provided herein to constitute a zoom lens, as described earlier. The image sensor 56 is provided, including CCD (charge coupled device) image sensor, CMOS (complementary metal oxide semiconductor) image sensor, or other similar sensors. The image signal recording/reproduction unit 52 is provided including arithmetic circuits with CPU (microcomputer) and other similar circuits. In addition to the image signal processing unit 50, the image signal recording/reproduction unit 52 is connected with an internal memory 53 for recording image signals, a monitor drive unit 54 for driving a display unit 104, a control unit 55 for controlling the optical system 51, etc. Signals are input to the control unit 55 from the outside of the imaging device by operating the zoom button 114 or the like, and the lens position of the optical system 51 is adjusted based on the signals supplied from the control unit 55.

In the imaging device 100 having the abovementioned structure, the wide-angle, standard, or macro mode of photography becomes feasible with the conversion lens system 47 being attached thereto.

First, the case will be described where the standard mode photography is carried with the imaging device 100. In this case, the adjusting ring 21 is adjusted by rotating so that the second transparent member 3 of the conversion lens 1 constituting the conversion lens system 47 is brought to be flat plane. When the second transparent member 3 of the conversion lens 1 becomes flat, the conversion lens 1 yields neither the wide nor macro function. As a result, the image taken into the imaging device 100 turns out the same as the case where no conversion lens system 47 is mounted, and the image is taken at the magnification setting of the optical system, which is set by the imaging device body 103. For example, the images taken, or photographed, in this case are the same as those shown earlier in FIGS. 4B and 4C.

Next, the case will be described where the wide angle photography is carried out using the imaging device 100 at the wide angle end of the imaging device body 103. First, through operating the optical system 51 constituting the zoom lens by manipulating the zoom button 114, the focal length of the optical system 51 in the imaging device body 103 is brought to be minimum, i.e., at the wide end (wide angle end). Subsequently, by turning the adjusting ring 21 of conversion lens system 47, the second transparent member 3 in the conversion lens 1 is adjusted to become into the concave shape. By bringing the second transparent member 3 into the concave shape, the conversion lens 1 is turned to be a wide angle convertor having the wide angle function, and the imaging angle of the image taken into the imaging device 100 is expanded to the wide angle side. Therefore, the image photographed in this case is the same as that previously shown in FIG. 4A, for example.

Also in this case, by adjusting the adjusting ring 21 by suitably turning, the curvature of the second transparent member 3 can be continuously changed to be any curvature value. Therefore, at the wide angle end of the optical system 51 in the imaging device body 103, the magnification can be varied toward the wide angle side at will to have any image angle up to the maximum image angle.

Next, the case will be described where the macro photography is carried out using the imaging device 100 at the telephoto end of the imaging device body 103. First, through operating the optical system 51 including the zoom lens by manipulating the zoom button 114, the focal length of the optical system 51 in the imaging device body 103 brought to be infinite, i.e., at the telephoto end (telescopic end). Subsequently, by turning the adjusting ring 21 of conversion lens system 47, the second transparent member 3 in the conversion lens 1 is adjusted to become into the convex shape. By bringing the second transparent member 3 into the convex shape, the conversion lens 1 is turned to be a close-up lens having the macro functions, a photograph can be taken by approaching more closely to the object to be photographed. For example, the image taken in this case is the same as that previously shown in FIG. 4D.

Also in this case, by adjusting the adjusting ring 21 by suitably turning, the curvature of the second transparent member 3 can be continuously changed to be any curvature value. Accordingly, the distance between an object to be photographed and the imaging device body 103 closing into the object can be set at will.

As described herein above, with the conversion lens system 47 according to the present embodiment, and also with the imaging device 100 provided with the conversion lens system 47 of the present embodiment, the switching over among the wide-angle, standard, or macro mode of photography becomes feasible with the conversion lens system 47 being attached, in front of the optical system 51 in the imaging device body 103. That is, it has been necessary to dismount wide-end conversion lenses and close-up lenses hitherto known from the imaging device body when not in use. However, the conversion lens according to an embodiment can be used without any trouble of dismounting from the imaging device body, since the shape of this conversion lens can be changed optionally between concave, plane, and convex, and the function of the conversion lens can be switched readily depending on usage.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A conversion lens comprising:
a first transparent member placed on an object side;
a second transparent member placed on an image side, at least one of the first transparent member and the second transparent member being formed of a deformable film which has a curvature;
a bellows structure which forms a sealed space sandwiched between the first transparent member and the second transparent member by connecting the first transparent member and the second transparent member;
a transparent liquid filled in the sealed space; and
a curvature changing mechanism which includes a first frame body and a second frame body, the curvature changing mechanism being configured to, using the first frame body and the second frame body, change the curvature by moving the transparent liquid.

2. The conversion lens of claim 1, wherein:
(a) the first transparent member is formed of one of a solid flat plate and a solid lens; and
(b) the second transparent member is formed of the deformable film.

3. The conversion lens of claim 1, wherein the curvature changing mechanism includes the bellows structure.

4. The conversion lens of claim 1, wherein the curvature of the deformable film is continuously changed to have a shape of any one of concave, plane, and convex.

5. A conversion lens system comprising:
a conversion lens including:
(a) a first transparent member placed on an object side;
(b) a second transparent member placed on an image side, at least one of the first transparent member and the second transparent member being formed of a deformable film which has a curvature;
(c) a bellows structure which forms a sealed space sandwiched between the first transparent member and the second transparent member by connecting the first transparent member and the second transparent member;
(d) a transparent liquid filled in the sealed space; and
(e) a curvature changing mechanism which includes a first frame body and a second frame body, the curvature changing mechanism being configured to, using the first frame body and the second frame body, change the curvature by moving the transparent liquid; and
curvature control means for controlling the change of the curvature by controlling the curvature changing mechanism.

6. A conversion lens system comprising:
a conversion lens having: (a) a first side on a first outer periphery; and (b) a second side which is opposite to the first side on a second outer periphery, the conversion lens including:
(a) a first transparent member placed on an object side;
(b) a second transparent member placed on an image side, at least one of the first transparent member and the second transparent member being formed of a deformable film having a curvature;
(c) a bellows structure formed as a bellows structure having elastic pleats, the bellows structure configured to form a sealed space sandwiched between the first transparent member and the second transparent member by connecting the first transparent member and the second transparent member;
(d) a transparent liquid filled in the sealed space; and
(e) a curvature changing mechanism which includes a first frame body and a second frame body, the curvature changing mechanism being configured to, using the first frame body and the second frame body, change the curvature by moving the transparent liquid; and curvature control means for controlling the change of the curvature of the deformable film by controlling the curvature changing mechanism, the curvature control means including:
  (a) a lens frame bonded and fixed to the first side; and
  (b) a movable plate bonded and fixed to the second side so as to be movable relative to the lens frame.

7. The conversion lens system of claim 5, wherein:
  (a) the first transparent member is formed of one of a solid flat plate and a solid lens; and
  (b) the second transparent member is formed of the deformable film.

8. An imaging device comprising:
an imaging device body including an optical system; and
a conversion lens system mounted on a side of object of the optical system of the imaging device body, the conversion lens system including:
(a) a conversion lens having:
  (i) a first transparent member placed on an object side;
  (ii) a second transparent member placed on an image side, at least one of the first transparent member and the second transparent member being formed of a deformable film which has a curvature;
  (iii) a bellows structure which forms a sealed space sandwiched between the first transparent member and the second transparent member by connecting the first transparent member and the second transparent member;
  (iv) a transparent liquid filled in the sealed space; and
  (v) a curvature changing mechanism which includes a first frame body and a second frame body, the curvature changing mechanism being configured to, using the first frame body and the second frame body, change the curvature by moving the transparent liquid filled; and
(b) curvature control means for controlling the change of the curvature by controlling the curvature changing mechanism.

9. An imaging device comprising:
an imaging device body including an optical system; and
a conversion lens system mounted on a side of object of the optical system of the imaging device body, the conversion lens system including:
(a) a conversion lens having: (A) a first side on a first outer periphery; and (B) a second side which is opposite to the first side on a second outer periphery, the conversion lens including:
  (i) a first transparent member placed on an object side;
  (ii) a second transparent member placed on an image side, at least one of the first transparent member and the second transparent member being formed of a deformable film which has a curvature;
  (iii) a bellows structure having elastic pleats, the bellows structure being configured to form a sealed space sandwiched between the first transparent member and the second transparent member by connecting the first transparent member and the second transparent member;
  (iv) a transparent liquid filled in the sealed space; and
  (v) a curvature changing mechanism which includes a first frame body and a second frame body, the curvature changing mechanism being configured to, using the first frame body and the second frame body, change the curvature by moving the transparent liquid; and
(b) curvature control means for controlling the change of the curvature by controlling the curvature changing mechanism, the curvature control means having:
  (i) a lens frame bonded and fixed to the first side; and
  (ii) a movable plate bonded and fixed to the second side so as to be movable relative to the lens frame.

10. A conversion lens system comprising:
a conversion lens including:
(a) a first transparent member placed on an object side;
(b) a second transparent member placed on an image side, at least one of the first transparent member and the second transparent member being formed of a deformable film which has a curvature;
(c) a bellows structure configured to form a sealed space sandwiched between the first transparent member and the second transparent member by connecting the first transparent member and the second transparent member;
(d) a transparent liquid filled in the sealed space; and
(e) a curvature changing mechanism which includes a first frame body and a second frame body, the curvature changing mechanism being configured to, using the first frame body and the second frame body, change the curvature by moving the transparent liquid; and
a curvature control device configured to control a change of the curvature by controlling the curvature changing mechanism.

11. A conversion lens system comprising:
a conversion lens having: (a) a first side on a first outer periphery; and (b) a second side which is opposite to the first side on a second outer periphery, the conversion lens including:
(a) a first transparent member placed on an object side;
(b) a second transparent member placed on an image side, at least one of the first transparent member and the second transparent member being formed of a deformable film;
(c) a bellows structure having elastic pleats, the bellows structure configured to form a sealed space sandwiched between the first transparent member and the second transparent member by connecting the first transparent member and the second transparent member;
(d) a transparent liquid filled in the sealed space; and
(e) a curvature changing mechanism which includes a first frame body and a second frame body, the curvature changing mechanism being configured to, using the first frame body and the second frame body, change the curvature of the deformable film by moving the transparent liquid filled in the sealed space; and
a curvature control device configured to control a change of the curvature by controlling the curvature changing mechanism, the curvature control device including:
  (a) a lens frame bonded and fixed to the first side; and
  (b) a movable plate bonded and fixed to the second side so as to be movable relative to the lens frame.

12. An imaging device comprising:
an imaging device body including an optical system; and
a conversion lens system mounted on a side of object of the optical system of the imaging device body, the conversion lens system including:
(a) a conversion lens having:
  (i) a first transparent member placed on an object side;

(ii) a second transparent member placed on an image side, at least one of the first transparent member and the second transparent member being formed of a deformable film which has a curvature;
(iii) a bellows structure configured to form a sealed space sandwiched between the first transparent member and the second transparent member by connecting the first transparent member and the second transparent member;
(iv) a transparent liquid filled in the sealed space; and
(v) a curvature changing mechanism which includes a first frame body and a second frame body, the curvature changing mechanism being configured to, using the first frame body and the second frame body, change the curvature by moving the transparent liquid; and
(b) a curvature control device configured to control the change of the curvature by controlling the curvature changing mechanism.

13. An imaging device comprising:
an imaging device body including an optical system; and
a conversion lens system mounted on a side of object of the optical system of the imaging device body, the conversion lens system including:
(a) a conversion lens having: (A) a first side on a first outer periphery; and (B) a second side which is opposite to the first side on a second outer periphery, the conversion lens including:
(i) a first transparent member placed on an object side;
(ii) a second transparent member placed on an image side, at least one of the first transparent member and the second transparent member being formed of a deformable film which has a curvature;
(iii) a bellows structure having elastic pleats, the bellows structure being configured to form a sealed space sandwiched between the first transparent member and the second transparent member by connecting the first transparent member and the second transparent member;
(iv) a transparent liquid filled in the sealed space; and
(v) a curvature changing mechanism which includes a first frame body and a second frame body, the curvature changing mechanism being configured to, using the first frame body and the second frame body, change the curvature by moving the transparent liquid; and
(b) a curvature control device configured to control the change of the curvature by controlling the curvature changing mechanism, the curvature control means having:
(i) a lens frame bonded and fixed to the first side; and
(ii) a movable plate bonded and fixed to the second side so as to be movable relative to the lens frame.

* * * * *